US012608674B2

(12) United States Patent
Oberemk et al.

(10) Patent No.: US 12,608,674 B2
(45) Date of Patent: Apr. 21, 2026

(54) MACHINE LEARNING MODEL FOR PREDICTING SCHEDULED DELIVERY FOR A SELF-PICKED ORDER

(71) Applicant: Maplebear Inc., San Francisco, CA (US)

(72) Inventors: Mark Oberemk, Toronto (CA); Akshay Bagai, Oakville (CA); Brent Scheibelhut, Toronto (CA); Madeline Mesard, New York, NY (US); Hua Xiao, Toronto (CA); Naval Shah, Toronto (CA)

(73) Assignee: Maplebear Inc., San Francisco, CA (US)

( * ) Notice: Subject to any disclaimer, the term of this patent is extended or adjusted under 35 U.S.C. 154(b) by 178 days.

(21) Appl. No.: 18/442,992

(22) Filed: Feb. 15, 2024

(65) Prior Publication Data

US 2025/0265535 A1     Aug. 21, 2025

(51) Int. Cl.
*G06Q 10/0832* (2023.01)
*G06Q 10/087* (2023.01)

(52) U.S. Cl.
CPC ....... *G06Q 10/0832* (2013.01); *G06Q 10/087* (2013.01)

(58) Field of Classification Search
CPC .......................... G06Q 10/0832; G06Q 10/087
See application file for complete search history.

(56) References Cited

U.S. PATENT DOCUMENTS

| | | | | |
|---|---|---|---|---|
| 7,711,600 | B1 * | 5/2010 | Curran | G06Q 30/0601 705/16 |
| 11,257,023 | B1 * | 2/2022 | Rafii | H04L 67/52 |
| 11,526,831 | B1 * | 12/2022 | Rafii | G06F 3/0487 |
| 2014/0330741 | A1 * | 11/2014 | Bialynicka-Birula | G06Q 10/0838 705/341 |
| 2015/0294262 | A1 * | 10/2015 | Nelson | G06Q 10/083 705/330 |
| 2016/0247219 | A1 * | 8/2016 | Sorensen | G06F 16/9535 |

(Continued)

OTHER PUBLICATIONS

Yakymchuk, Bohdan, and Olena Liashenko. "Modeling the resource planning system for grocery retail using machine learning." International Conference on Information and Communication Technologies in Education, Research, and Industrial Applications. Cham: Springer Nature Switzerland, 2023. (Year: 2023).*

*Primary Examiner* — Nathan A Mitchell
(74) *Attorney, Agent, or Firm* — Fenwick & West LLP

(57) ABSTRACT

A trained model is used to predict a scheduled delivery for a self-picked order. Responsive to receiving an indication from a device associated with a user of an online system that the device is either within a defined vicinity from a location of a retailer or physically present at the location of the retailer, the online system applies a user targeting computer model trained to generate, based on user data and ordering data, a score for the user indicative of a likelihood of the user accepting an offer for the scheduled delivery of the order. Responsive to the score being greater than a threshold score, the online system generates a list of service options for the scheduled delivery of the order and displays the list of service options at a user interface of the device prompting the user to select a service option for the scheduled delivery of the order.

18 Claims, 6 Drawing Sheets

(56)                  References Cited

U.S. PATENT DOCUMENTS

2017/0236088 A1* 8/2017 Rao ................ G06Q 10/063112
                                                    705/7.17
2020/0349497 A1* 11/2020 Dearing ............. G06Q 10/0834
2022/0114652 A1* 4/2022 Belke ..................... G06Q 30/06
2022/0147916 A1* 5/2022 Usami ................ G06Q 30/0261
2022/0343375 A1* 10/2022 Strayer ............. G06Q 30/0635
2024/0403812 A1* 12/2024 Chen .................. G06Q 10/0833
2024/0420037 A1* 12/2024 Wang ................. G06Q 30/0601

* cited by examiner

Smart Shopping Cart
150

Dashboard
315

Cameras
310

Weight Sensors
305

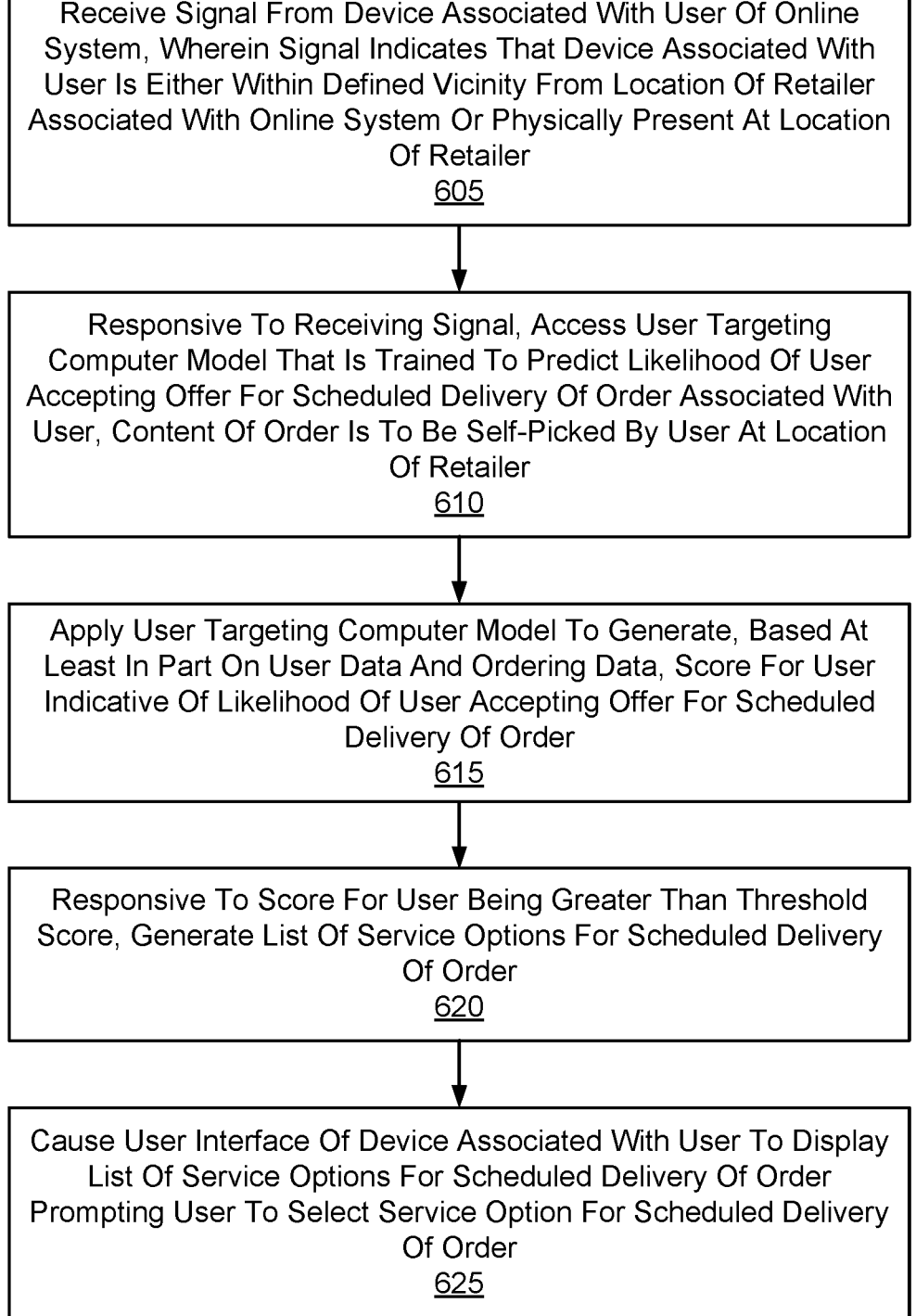

Receive Signal From Device Associated With User Of Online System, Wherein Signal Indicates That Device Associated With User Is Either Within Defined Vicinity From Location Of Retailer Associated With Online System Or Physically Present At Location Of Retailer
605

Responsive To Receiving Signal, Access User Targeting Computer Model That Is Trained To Predict Likelihood Of User Accepting Offer For Scheduled Delivery Of Order Associated With User, Content Of Order Is To Be Self-Picked By User At Location Of Retailer
610

Apply User Targeting Computer Model To Generate, Based At Least In Part On User Data And Ordering Data, Score For User Indicative Of Likelihood Of User Accepting Offer For Scheduled Delivery Of Order
615

Responsive To Score For User Being Greater Than Threshold Score, Generate List Of Service Options For Scheduled Delivery Of Order
620

Cause User Interface Of Device Associated With User To Display List Of Service Options For Scheduled Delivery Of Order Prompting User To Select Service Option For Scheduled Delivery Of Order
625

FIG. 6

MACHINE LEARNING MODEL FOR PREDICTING SCHEDULED DELIVERY FOR A SELF-PICKED ORDER

BACKGROUND

Online concierge shopping has become popular. In online concierge shopping, a user places an order with an online concierge system, which then dispatches a shopper to pick up the order at a store and delivers the order to the user. In certain cases, however, people may prefer to self-pick some items in a store but would not be able to bring those items home. As a result, the users may not shop at the store. For example, the user of the online system may want to grocery shop during lunch near their place of work but would not be able to bring the self-picked groceries home until much later, thereby making the shopping inconvenient or impossible.

An online concierge system may provide an option to deliver items that are picked at a store by the user. However, there is a technical problem of how to predict whether a user of an online system is likely to have the aforementioned issues with in-store grocery shopping and thus need a scheduled delivery service provided by the online system that solves the issues of later delivery of self-picked items both at a personal level for a given user as well as at a large scale for a collection of users of the online system.

SUMMARY

Embodiments of the present disclosure are directed to utilizing a trained computer model of an online system (e.g., online concierge system) to predict a scheduled delivery for a self-picked order.

In accordance with one or more aspects of the disclosure, the online system receives a signal from a device associated with a user of the online system, wherein the signal indicates that the device associated with the user is either within a defined vicinity from a location of a retailer associated with the online system or physically present at the location of the retailer. Responsive to receiving the signal, the online system accesses a user targeting computer model of the online system that is trained to predict a likelihood of the user accepting an offer for a scheduled delivery of an order associated with the user, wherein content of the order is to be self-picked by the user at the location of the retailer. The online system applies the user targeting computer model to generate, based at least in part on user data and ordering data, a score for the user indicative of the likelihood of the user accepting the offer for the scheduled delivery of the order. Responsive to the score for the user being greater than a threshold score, the online system generates a list of service options for the scheduled delivery of the order. The online system causes a user interface of the device associated with the user to display the list of service options for the scheduled delivery of the order prompting the user to select a service option for the scheduled delivery of the order from the list of service options.

BRIEF DESCRIPTION OF THE DRAWINGS

FIG. 6 is a flowchart for a method of using a trained computer model of an online concierge system to predict a scheduled delivery for a self-picked order, in accordance with one or more embodiments.

DETAILED DESCRIPTION

Figure 1:
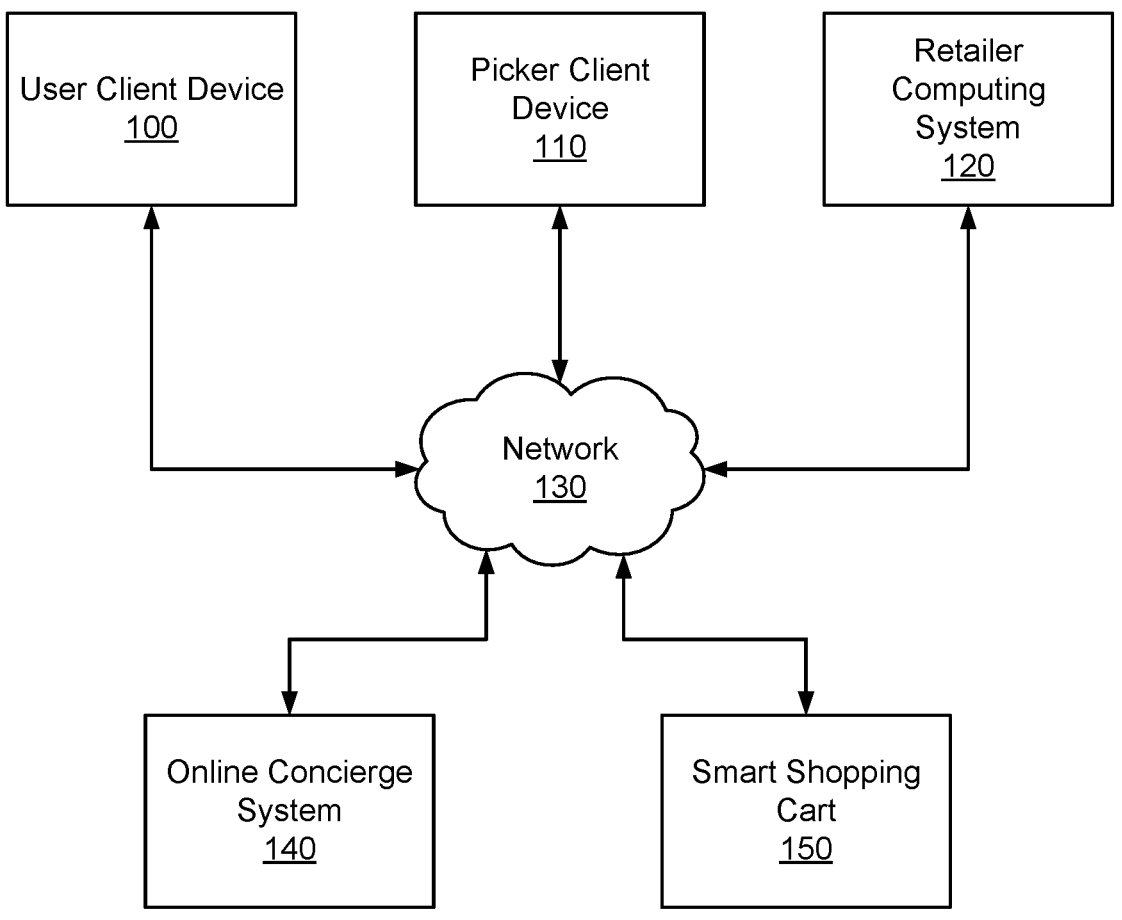
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, an online concierge system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 enables a user of the online concierge system 140 to self-pick items at a location of a retailer associated with the online concierge system 140 (e.g., at a grocery store), and then leave the self-picked items at the location of the retailer to be delivered to the user's premises later. In such case, after self-picking an order at the location of the retailer, the user would allow fulfillment from the location of the retailer to a user's delivery address (e.g., user's home) to be handled by the online concierge system 140, instead of the user bringing the self-picked items back home themselves. This particular service of the online concierge system 140 can be referred to herein as a "self-pick scheduled delivery" service.

The "self-pick scheduled delivery" service may be particularly attractive in the following use cases. For example, the "self-pick scheduled delivery" service may be offered by the online concierge system 140 when a user needs to buy bulky items (e.g., a large number of groceries that would be difficult to carry home, large kitchen appliances, furniture, etc.). Additionally or alternatively, the "self-pick scheduled delivery" service may be offered by the online concierge system 140 in the case of time constraints. For example, a user may not have time to make the trip home, such as if they were going to a grocery store near their office on their break time but cannot make it home within the allotted break window. Additionally or alternatively, the "self-pick scheduled delivery" service may be offered by the online concierge system 140 when a user does not have a personal vehicle, and using public transportation with a lot of groceries could be inconvenient. Additionally or alternatively, the "self-pick scheduled delivery" service may be offered by the online concierge system 140 when a user wants to purchase fragile items (e.g., glassware, eggs, etc.) which could potentially break on the way home. Additionally or alternatively, the "self-pick scheduled delivery" service may be offered by the online concierge system 140 when a user wants to purchase frozen and/or cold items (e.g., ice cream, frozen food, etc.) that need to be kept cold, and without proper transportation, they might melt or get spoiled. Additionally or alternatively, the "self-pick scheduled delivery" service may be offered by the online concierge system 140 in the case of bad weather conditions since inclement weather conditions can make carrying groceries home inconvenient. Additionally or alternatively, the "self-pick scheduled delivery" service may be offered by the online concierge system 140 when a user has certain physical limitations which make it hard for them to carry groceries home.

In order to offer the "self-pick scheduled delivery" service to a user of the online concierge system 140, the online concierge system 140 is required to predict whether the user actually needs the "self-pick scheduled delivery" service.

The online concierge system 140 may determine, based on a set of inputs, whether to offer the "self-pick scheduled delivery" service to the user by applying a trained computer model (e.g., machine-learning model) that generates a score for the user indicative of a likelihood of the user accepting the "self-pick scheduled delivery" service if offered. The set of inputs provided to the trained computer model may be related to reasons why the user may want the "self-pick scheduled delivery" service, such as the user's current location with respect to a user's home, the user's location within the grocery store, the time of day, and other historical patterns. Responsive to the predicted likelihood represented by the user's score greater than a threshold, the online concierge system 140 may communicate an offer for the "self-pick scheduled delivery" service to the user via, e.g., a mobile application associated with the online concierge system 140 that is running on the user client device 100. The online concierge system 140 may also utilize another trained computer model (e.g., machine-learning model) to determine whether and when the "self-pick scheduled delivery" service is available for the user.

The online concierge system 140 presented herein includes a logistics that enables the user to self-pick their order and then hand off their items for a scheduled delivery later. The logistics may be triggered based on the user being near the location of the retailer or at the location of the retailer. After that, the online concierge system 140 may deploy the trained computer model, and based on an output of the trained computer model (e.g., user's score), the online concierge system 140 offers the "self-pick scheduled delivery" service to the user. The trained computer model may also identify potential users suitable for offering the "self-pick scheduled delivery" service even before they are at the location of the retailer, e.g., by analyzing their mobile application usage for in-store shopping list creation and curation. Furthermore, the trained computer model may identify potential users of the "self-pick scheduled delivery" service by tracking their in-store behavior using the smart shopping cart 150 that is in communication with the online concierge system 140. The online concierge system 140 is described in further detail below with regards to FIG. 2.

The smart shopping cart 150 is an in-store shopping cart that enables a user of the online concierge system 140 to physically add (i.e., place) items from a location of a retailer (e.g., store) into the smart shopping cart 150 and check them out from the location of the retailer without an involvement of an employee of the retailer at the point of sale. The smart shopping cart 150 may be connected to the online concierge system 140 via the network 130. During the user's shopping session, the smart shopping cart 150 may utilize various sensors (e.g., one or more weight sensors, one or more cameras, etc.) to gather data about the user's activity, including, but not limited to, a location of the smart shopping cart 150 in the store, weight changes of the smart shopping cart 150 as items are added to or removed from the smart shopping cart 150, video of the user's activity in and around the smart shopping cart 150, etc. In one or more embodiments, the smart shopping cart 150 is considered being a part of the online concierge system 140. Note that the concepts described herein in relation to the smart shopping cart 150 can be extended/applied to other form factors, such as a handheld shopping basket, a handheld receptacle, or some other handheld object that can be used to receive and store shopping items. Details about integration of the smart shopping cart 150 with the "self-pick scheduled delivery" service offered by the online concierge system 140 are described below with regards to FIG. 2 and FIG. 3.

Figure 2:
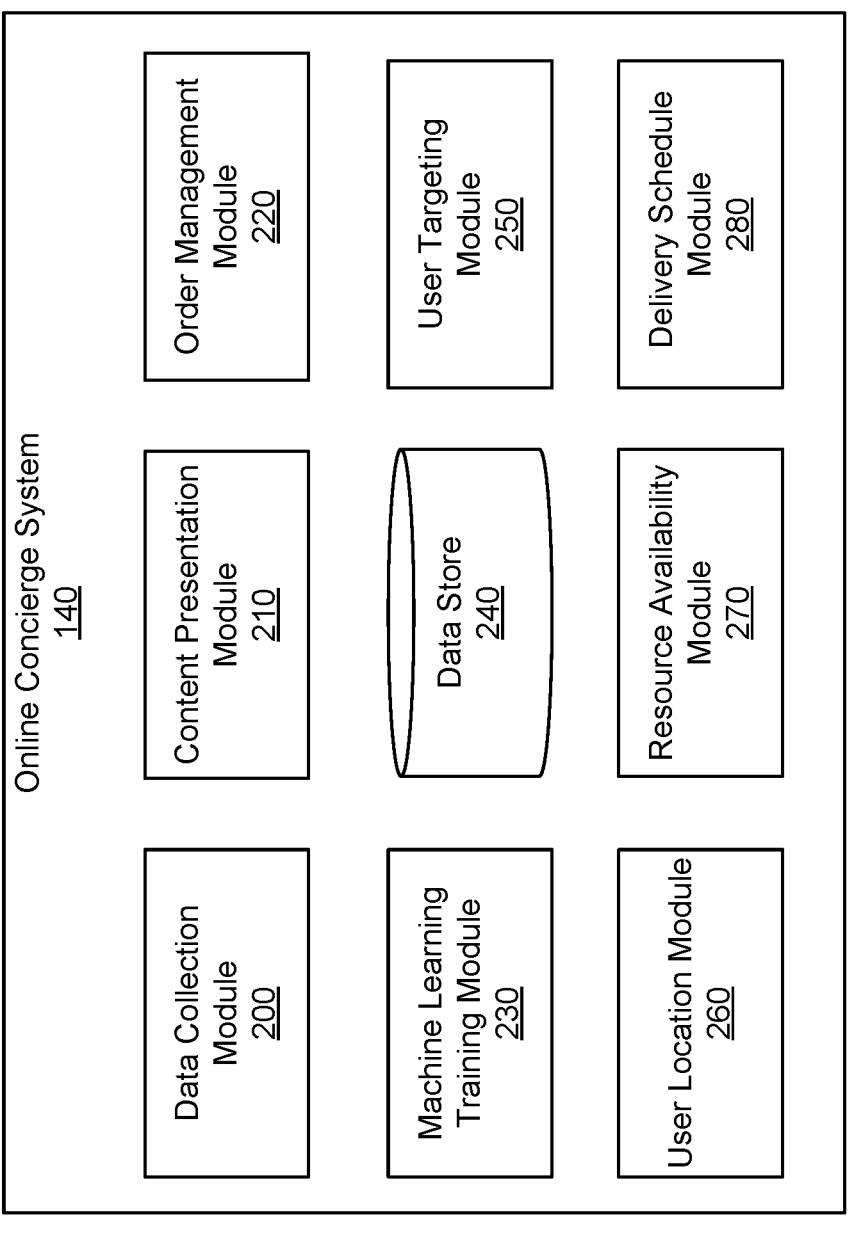
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a user targeting module 250, a user location module 260, a resource availability module 270, and a delivery schedule module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The user targeting module 250 may access a user targeting computer model (e.g., machine-learning computer model) that is trained to predict a likelihood of a user of the online concierge system 140 accepting an offer for a scheduled delivery of an order self-picked by the user. The user targeting module 250 may deploy the user targeting computer model to run a machine-learning algorithm to generate, based on a set of inputs, a score for the user indicative of (e.g., proportional to) the likelihood of the user accepting the offer for the scheduled delivery of the self-picked order. A set of parameters for the user targeting computer model may be stored at one or more non-transitory computer-readable media of the user targeting module 250. Alternatively, the set of parameters for the user targeting computer model may be stored at one or more non-transitory computer-readable media of the data store 240.

The user targeting module 250 may provide the set of inputs to the user targeting computer model that are generally related to the reasons that a person would need the scheduled delivery for the self-picked order. For example, in providing the set of inputs to the user targeting computer model, the user targeting module 250 may provide data with information about a user's geographical location (e.g., information that the user is within a defined vicinity from the location of the retailer), a velocity of the user when arriving near the location of the retailer (e.g., an indication on whether the user has a car), time of day (e.g., an indication on whether the user is at lunch break during a workday), an inclement weather at the area where the user is currently located, some other information, or some combination thereof. Note that the user's geographical location and the user's velocity information may be obtained via the user client device 100 and communicated, via the network 130, to the user location module 260. The user location module 260 may then provide the user's geographical location and the user's velocity information to the user targeting module 250 or directly to the user targeting computer model. Additionally, the set of inputs provided to the user targeting computer model may further include information about a location of the user within a grocery store (e.g., an indication on whether the user is avoiding freezer aisle as obtained by one or more sensors of the smart shopping cart 150), and one or more features of items added by the user from the location of the retailer to a basket of the smart shopping cart 150.

Figure 3:
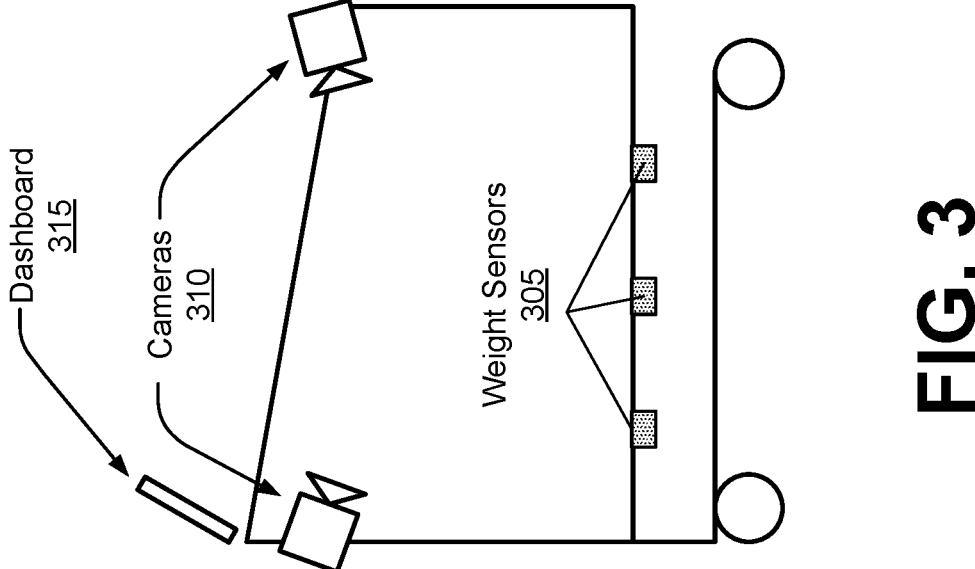
FIG. 3 illustrates an example smart shopping cart associated with an online concierge system, in accordance with one or more embodiments.

FIG. 3 illustrates an example smart shopping cart 150 associated with the online concierge system 140, in accordance with one or more embodiments. The smart shopping cart 150 may be equipped with one or more weight sensors 305 that measure weights of items placed in the smart shopping cart 150. Alternatively or additionally, the smart shopping cart 150 may have one or more cameras 310 that collect video data and/or image data in relation to items placed in the smart shopping cart 150, such as a weight of each item as indicated in an item label, a brand of each item, a price of each item, etc. Alternatively or additionally, the one or more cameras 310 may collect video data and/or image data in relation to actions in and around the smart shopping cart 150, such as a location of the smart shopping cart 150 at the store when a certain action occurs (e.g., when an item is added to the cart), user's gestures when placing items in the smart shopping cart 150, video and/or images of user's interactions with the smart shopping cart 150, track the location of the user within the store, etc. Hence, the weight sensors 305 and, optionally, the cameras 310 can gather information on whether items added to the basket of the smart shopping cart 150 are heavy items that may be hard to be brought home. The smart shopping cart 150 may include additional sensors not shown in FIG. 3. Data gathered by various sensors of the smart shopping cart 150 may be uploaded via the network 130 to the user targeting module 250.

In one or more embodiments, the user who is using the smart shopping cart 150 for in-store purchase can park the smart shopping cart 150 at a store's exit, bypass payment and checkout. The checkout would be then completed by the user online, while packing and staging would be completed by either an employee at the location of retailer (e.g., by the store's delivery service) or a picker (i.e., driver) associated with the online concierge system 140. Hence, integration of the smart shopping cart 150 with the "self-pick scheduled delivery" service offered by the online concierge system 140 allows the user to quickly move on with their day, without needing to wait for a checkout line.

There are a number of ways for the online concierge system 140 to identify a target market audience for the "self-pick scheduled delivery" service before the user enters the location of the retailer. The user targeting computer model along with the user targeting module 250 and the user location module 260 may automatically identify following scenarios that increase a likelihood of the user accepting the "self-pick scheduled delivery" service if offered. For example, a user of the online concierge system 140 with a grocery delivery application installed on the user client device 100 is detected to be within a short vicinity of a location of a retailer associated with the online concierge system 140. Additionally or alternatively, the user with the grocery delivery application installed on the user client device 100 is known to be in an area where there is predicted to be inclement weather. Additionally or alternatively, users of the online concierge system 140 who are known via omnichannel analysis of their purchasing patterns to soon be in the need of bulk item restocking, and happen to be near the location of the retailer that is known to have an in-store promotion. Additionally or alternatively, users of the online concierge system 140 who use the in-store lists on their grocery delivery applications more often and reside in metropolitan areas where they are less likely to own a vehicle are more likely to accept the "self-pick scheduled delivery" service if offered.

A shopping list and associated comments may be built by the user before shopping at the grocery delivery application installed on the user client device 100, and can be detected by the user targeting module 250 and analyzed by the user targeting computer model to determine if a potential shopping cart might be a good candidate for the "self-pick scheduled delivery" service. For example, if the list includes frozen food items that are planned to be bought, but the user is avoiding those sections when shopping (e.g., as detected by one or more sensors of the smart shopping cart 150), that would be a strong signal for targeting the user for the "self-pick scheduled delivery" service. Furthermore, if some user's comments (e.g., "save this for a bulk resupply shop", "need this for dinner tonight", etc.) are associated with the shopping list, the associated user's comments may be analyzed for intent by the user targeting computer model that can also operate as a language model (e.g., large language model).

The user targeting computer model may generate a score for a user of the online concierge system 140 indicative of a likelihood of the user accepting an offer for the "self-pick scheduled delivery" service based on one or more of the following input signals provided to the user targeting computer model. In one or more embodiments, the input signals for the user targeting computer model include information about a weight and/or quantity of items added by the user to a basket of the smart shopping cart 150 (e.g., gathered by the weight sensors 305 and/or the cameras 310 of the smart shopping cart 150). For example, an input signal that increases the likelihood of the user accepting the offer for the "self-pick scheduled delivery" service is an indication that the weight and/or quantity of items in the basket of the smart shopping cart 150 exceed defined threshold(s). Alternatively or additionally, the input signals for the user targeting computer model may include information about types of items (e.g., types of items in a user's shopping list at the user client device 100, types of items added to the smart shopping cart 150, etc.). For example, an input signal that increases the likelihood of the user accepting the offer for the "self-pick scheduled delivery" service would be an identification of specific types of items (e.g., bulky items, fragile items, frozen/cold items, etc.).

Alternatively or additionally, the input signals for the user targeting computer model may include information about a user's arrival time at a location of a retailer associated with the online concierge system 140. For example, the user's arrival time at the location of the retailer may be recorded as, e.g., a time-log by a tracking system of the smart shopping cart 150. An input signal that increases the likelihood of the user accepting the offer for the "self-pick scheduled delivery" service would be information (e.g., as provided from the tracking system of the smart shopping cart 150 via the network 130 to the user targeting module 250) that the user is spending a long time shopping or the user is shopping at times close to public transit schedules or potential break times (e.g., local lunch hour). Alternatively or additionally, the input signals for the user targeting computer model may include information about a user's physical limitation. For example, one or more sensors of the smart shopping cart 150 (e.g., the cameras 310) may capture video data identifying that the user has a physical limitation (e.g., physical disability since the user is using a motorized transportation device within the location of the retailer, or has small children with them at the location of the retailer), which can make the "self-pick scheduled delivery" service more attractive option for the user.

Alternatively or additionally, the input signals for the user targeting computer model may include an identification of returning users. For example, the user targeting module 250 may identify a returning user by recognizing an electronic store loyalty card of that user at the user client device 100. The user targeting module 250 may identify users who regularly shop large amounts of items but have never used the "self-pick scheduled delivery" service. On the other hand, the user targeting module 250 may also identify users who have previously used the "self-pick scheduled delivery" service and represent a good target for offering another "self-pick scheduled delivery" service. Alternatively or additionally, the input signals for the user targeting computer model may include an indication of local workers, i.e., users of the online concierge system 140 who shop at a given location of a retailer only at specific times of the day, and where that location of the retailer is distant from their delivery addresses, which is a strong indication that they are likely to only be local to that location of the retailer during work hours.

Alternatively or additionally, the input signals for the user targeting computer model may include information about content of a basket of the smart shopping cart 150 (e.g., as gathered by the weight sensors 305 and/or the cameras 310 and provided via the network 130 to the user targeting module 250). For example, a small amount of items in the basket of the smart shopping cart 150 where the items are not in a list of problematic types (e.g., heavy items, fragile items, frozen/cold items, etc.) may be an indication that the user is trying to avoid items of the problematic types and may be interested in the scheduled home delivery. Alternatively or additionally, the input signals for the user targeting computer model may include information about user's behavior while shopping at the location of the retailer using the smart shopping cart 150. For example, if one or more sensors of the smart shopping cart 150 (e.g., the cameras 310) detect signals of a user's interest in a particular item being one of the aforementioned problematic types, followed by a decision to walk away from that item, this may be a strong indication that the user avoids items they cannot take with them immediately, and may be interested in the scheduled home delivery.

Alternatively or additionally, the input signals for the user targeting computer model may include signals generated by tracking activities of a user on a grocery delivery application running on the user client device 100. For example, the user may be checking the in-store promotion materials using the grocery delivery application running at the user client device 100 and is detected at the location of the retailer or at a close vicinity of the location of the retailer. Also, the grocery delivery application running at the user client device 100 may identify that the user was not driving to the location of the retailer (e.g., based on whether the user walks from the parking lot to the store, or the speed the user travels before entering the store) and is currently shopping at the location of the retailer (or is checking in-store promotion materials near the location of the retailer). The corresponding signals about the user's location can be communicated from the user client device 100 via the network 130 to the user location module 250, which may provide the signals to the user targeting module 260 or directly to the user targeting computer model.

The resource availability module 270 may access a resource availability computer model (e.g., machine-learning computer model) that is trained to predict a likelihood for availability of resources for the "self-pick scheduled delivery" service. The resource availability module 270 may deploy the resource availability computer model to run a machine-learning algorithm to generate, based on a set of inputs, a resource availability score indicative of the likelihood for availability of resources for the "self-pick scheduled delivery" service. A set of parameters for the resource availability computer model may be stored at one or more non-transitory computer-readable media of the resource availability module 270. Alternatively, the set of parameters for the resource availability computer model may be stored at one or more non-transitory computer-readable media of the data store 240.

Note that certain logistics is required so that the online concierge system 140 can offer the "self-pick scheduled delivery" service to a user. For example, a storage area at a location of a retailer associated with the online concierge system 140 is needed where orders are stored and packaged since delivery of orders would happen in future. The resource availability module 270 may regularly receive (e.g., from the retailer computing system 120 via the network 130) updates about a current capacity of the storage area at the location of the retailer, including information about a current capacity of a cold storage system (e.g., refrigerator(s)) at the location of the retailer for storing frozen and/or cold items. Information about current capacities of storage areas at the location of the retailer may be provided as input signals to the resource availability computer model. For example, if there is no room at the cold storage system and a user's order contains cold and/or frozen items, the resource availability computer model would infer that it is not suitable to offer the "self-pick scheduled delivery" service to the user.

At a broader delivery network level, an important qualification to track by the resource availability module 270 and the resource availability computer model is whether it is possible to schedule delivery for the self-picked order, as well as the cost to fulfill that delivery. The resource availability computer model deployed by the resource availability module 270 may generate a range of fulfillment strategies for the scheduled delivery of the self-picked order based on one or more of the following insights: Is there an existing order to be fulfilled from the current location of the retailer (or a nearby location of the retailer) to locations within a defined vicinity of a user's destination address? If not, can the scheduled delivery be fulfilled during travel between other batches? Is it possible to rearrange existing delivery plans for existing orders to optimize fulfillment to work for this self-picked order? If not, is there a driver associated with the online concierge system 140 available to add to their fulfillment schedule to fulfill this self-picked order? Information about these insights may be gathered by the resource availability module 270 and provided as inputs to the resource availability computer model. Hence, the resource availability module 270 along with the resource availability computer model operates as a matching system to match the self-picked order with an available picker associated with the online concierge system 140 who is already going to visit the location of the retailer.

Responsive to the resource availability score output by the resource availability computer model being greater than a threshold availability score, the user targeting module 250 may be triggered to apply the user targeting computer model to generate the score for the user indicative of the likelihood of the user accepting the offer for the scheduled delivery of the order. Responsive to the score for the user being greater than a threshold score, the delivery schedule module 280 may be triggered to generate a list of service options for the "self-pick scheduled delivery" service. In one or more embodiments, the delivery schedule module 280 retrieves from a database at the data store 240, a pre-defined list of service options. The generated list of service options may represent a range of potential fulfillment strategies representing different service options. The delivery schedule module 280 may also assign to each service option a cost based on, e.g., a driver pay-per-order, driver pay-per-mile, expected delivery time, one or more other factors, or some combination thereof. Before offering different service options for the "self-pick scheduled delivery" service to the user, the delivery schedule module 280 may further reduce the list of service options based on, e.g., a configured maximum cost threshold.

The content presentation module 210 may receive, from the delivery schedule module 280, the list of service options for the "self-pick scheduled delivery" service for a given user of the online concierge system 140. The content presentation module 210 may cause the user client device 100 to display a user interface with the list of possible service options for the "self-pick scheduled delivery" service. The user may then utilize the user interface of the user client device 100 to select one service option from the list of service options for fulfillment. Alternatively, the user may not accept the offer for the "self-pick scheduled delivery" service.

The machine-learning training module 230 may perform initial training of the user targeting computer model and the resource availability computer model using, e.g., historical data related to a set of orders picked by pickers associated with the online concierge system 140 and/or self-picked by a collection of users of the online concierge system 140 that were then delivered by pickers (i.e., drivers) associated with the online concierge system 140. In one or more embodiments, the machine-learning training module 230 may simply offer, based on a set of heuristics, the "self-pick scheduled delivery" service to a collection of users of the online concierge system 140 in order to gather enough feedback responses from the users. The gathered feedback responses may be used as training data by the machine-learning training module 230 to perform initial training of the user targeting computer model and/or the resource availability computer model.

Furthermore, the machine-learning training module 230 may collect feedback data with information about a response by the user in relation to the list of service options for the "self-pick scheduled delivery" service that is displayed at the user interface of the user client device 100. The machine-learning training module 230 may use the collected feedback data to re-train the user targeting computer model and/or the resource availability computer model by updating the set of parameters of the user targeting computer model and/or updating the set of parameters of the resource availability computer model. Additionally, the delivery schedule module 280 may also use the collected feedback data to update the threshold score that triggers offering a list of service options for a scheduled delivery of a self-picked order to the user.

Figure 4:
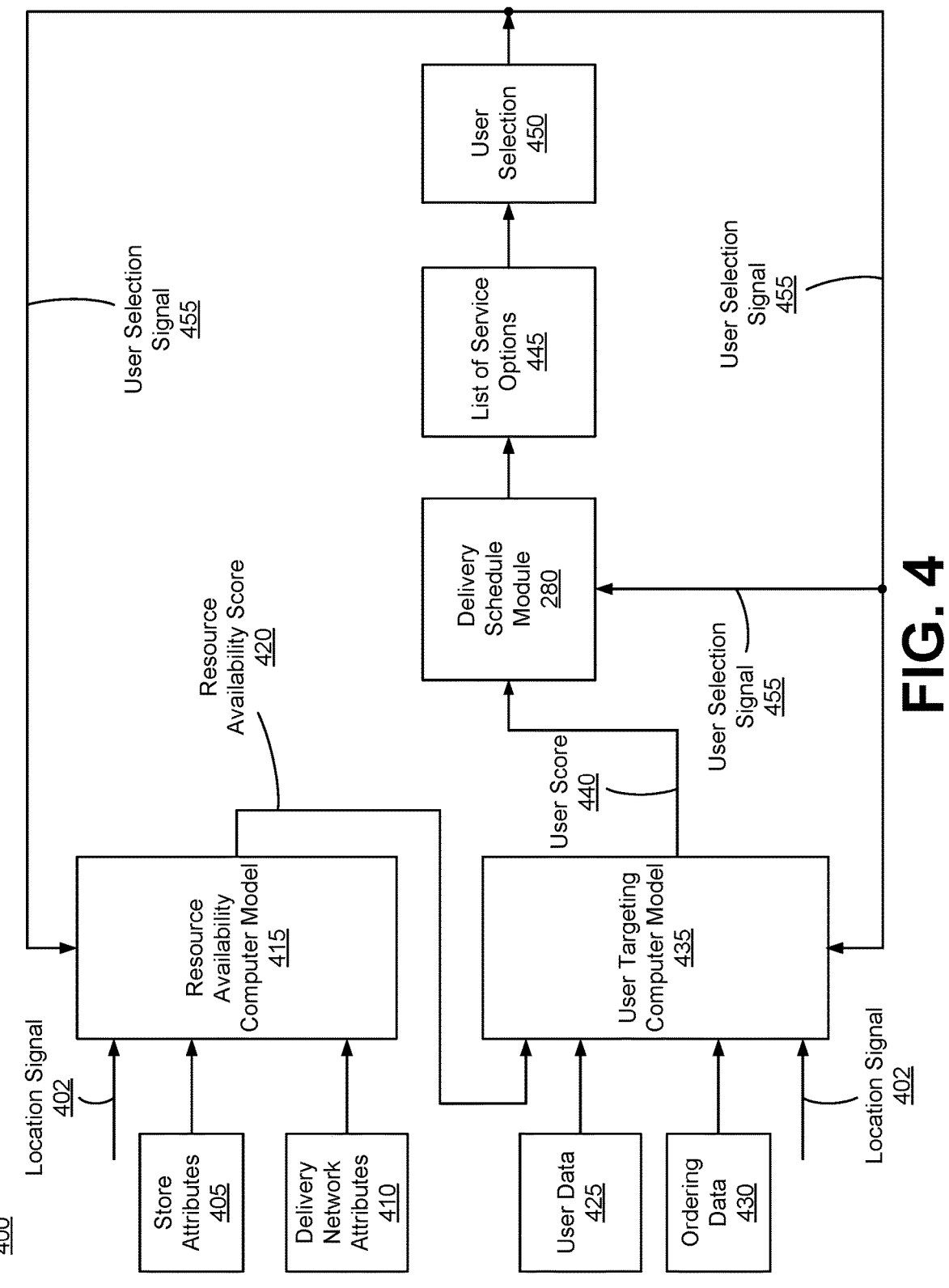
FIG. 4 illustrates an example architectural flow diagram of using trained computer models to generate a recommendation for a user of an online concierge system to select a scheduled delivery for an order self-picked by the user at a location of a retailer associated with the online concierge system, in accordance with one or more embodiments.

FIG. 4 illustrates an example architectural flow diagram 400 of using trained computer models to generate a recommendation for a user of the online concierge system 140 to select a scheduled delivery for an order self-picked by the user (e.g., "self-pick scheduled delivery" service) at a location of a retailer associated with the online concierge system 140, in accordance with one or more embodiments. Responsive to receiving a location signal 402 indicative of a device associated with the user (e.g., the user client device 100 or the dashboard 315 of the smart shopping cart 150) being either within a defined vicinity from the location of the retailer or physically present at the location of the retailer, the online concierge system 140 may access a resource availability computer model 415 trained to predict a likelihood for availability of resources for the "self-pick scheduled delivery" service. The resource availability module 270 may apply the resource availability computer model 415 to generate, based on a set of inputs, a resource availability score 420 indicative of the likelihood for availability of resources for the "self-pick scheduled delivery" service. The user location module 250 may receive the location signal 402 from the device associated with the user via the network 130 and then provide the received location signal 402 to the resource availability module 270 that deploys the resource availability computer model 415. Additionally, the user location module 250 may provide the received location signal 402 to the user targeting module 250 that deploys a user targeting computer model 435.

The set of inputs provided to the resource availability computer model 415 may be differentiated as store attributes 405 and delivery network attributes 410. The store attributes 405 may be, e.g., received at the resource availability module 270 via the network 130 from the retailer computing system 120. The store attributes 405 may include information about a current capacity of a packing storage space at the location of the retailer and/or information about a current capacity of a refrigerator-based storage space at the location of the retailer. The delivery network attributes 410 may be gathered by the resource availability module 270 (e.g., from different channels of the online concierge system 140 including the retailer computing system 120). The delivery network attributes 410 may include information about availability of a driver associated with the online concierge system 140 to fulfill the scheduled delivery of self-picked order and/or information about a cost to fulfill the scheduled delivery of self-picked order.

Responsive to receiving the location signal 402 and responsive to the resource availability score 420 being above a resource availability threshold score, the user targeting module 250 may access the user targeting computer model 435 that is trained to predict a likelihood of the user accepting an offer for the scheduled delivery of self-picked order. The user targeting module 250 may apply the user targeting computer model 435 to generate, based on a set of inputs, a user score 440 that is indicative of the likelihood of the user accepting the offer for the scheduled delivery of the self-picked order. The set of inputs provided to the resource availability computer model 415 may be gathered by the user targeting module 250 and/or the user location module 260 and differentiated as user data 425 and ordering data 430.

In one or more embodiments, the user data 425 is gathered by the user location module 260 and/or the user targeting module 250 (e.g., received from the user client device 100 via the network 130 or obtained via one or more other sources of the online concierge system 140). The user data 425 may include, e.g., a delivery address of the user, a geographical location of the user relative to the location of the retailer, a geographical location of the user where there is a prediction for an inclement weather, a list of items for purchase made by the user at the user client device 100, information that the user is viewing at a user interface of the user client device 100 promotion coupons for purchasing at the location of the retailer, an indication that the user arrived at the location of the retailer without using a motor vehicle, etc. Alternatively or additionally, the user data 425 may include information retrieved from the data store 240, such as information about a purchasing pattern of the user over a defined time period, information about a collection of items previously purchased by the user, information that the user purchased items at the location of the retailer at least a threshold number of times, information that the user previously used scheduled delivery services for self-picked orders at the same or different location of the retailer.

In one or more embodiments, the ordering data 430 is gathered by the user targeting module 250 after being received from the smart shopping cart 150 via the network 130. The ordering data 430 may be related to a set of items added by the user to a basket of the smart shopping cart 150 that is in communication with the online concierge system 140. The ordering data 430 may include, e.g., a weight of the set of items in the basket of the smart shopping cart 150, a quantity of the set of items in the basket of the smart shopping cart 150, a set of features associated with the set of items, a timestamp when the user started purchasing at the location of the retailer using the smart shopping cart 150, information about detection of a physical limitation associated with the user, information about a behavior of the user during purchasing at the location of the retailer using the smart shopping cart 150, etc.

The delivery schedule module 280 may receive the user score 440 output by the user targeting computer model 435. Responsive to the user score 440 greater than a threshold score, the delivery schedule module 280 may generate a list of service options 445 for the scheduled delivery of self-picked order. In one or more embodiments, responsive to the user score 440 greater than the threshold score, the delivery schedule module 280 is triggered to retrieve the list of service options 445 from a database at the data store. In one or more other embodiments, the delivery schedule module 280 generates the list of service options 445 based also on a value of the user score 440. For example, for the user score 440 that is greater than the threshold score but still smaller than a second threshold score, the delivery schedule module 280 may generate the list of service options 445 that includes a longer list of service options in order to motivate the user to accept a suitable service option from the list of service options 445. The list of service options 445 may be offered to the user (e.g., via the user interface of the user client device 100 or the dashboard 315), which prompts the user to select a desired service option for the scheduled delivery of the self-picked order. The user's selection of the service option for the scheduled delivery of the self-picked order may be recorded (e.g., via the machine-learning training module 230 and stored at the data store 240) as a user selection 450. A signal indicative of the user selection 450, i.e., a user selection signal 455, may be utilized for re-training the resource availability computer model 415 and/or the user targeting computer model 435. Furthermore, the user selection signal 455 may be used by the delivery schedule module 280 for updating the threshold score and the second threshold score in order to refine when the list of service options 445 is offered to the user and what particular list of service options 445 is offered to the user.

Figure 5:
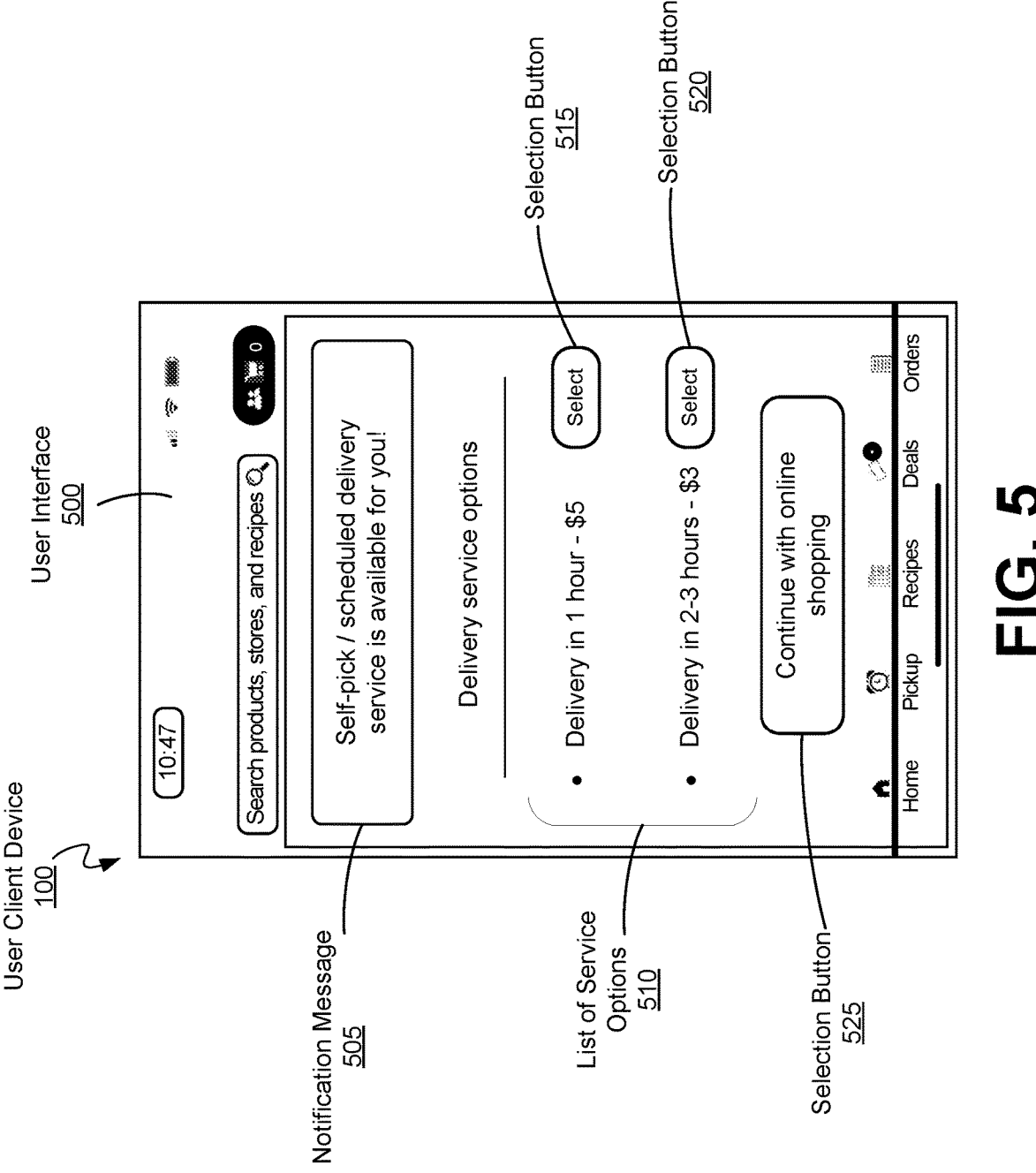
FIG. 5 illustrates an example user interface of a user client device with a list of service options recommended to a user of an online concierge system for delivery of an order self-picked by the user at a location of a retailer associated with the online concierge system, in accordance with one or more embodiments.

FIG. 5 illustrates an example user interface 500 of the user client device 100 with a list of service options recommended to a user of the online concierge system 140 for delivery of an order self-picked by the user at a location of a retailer associated with the online concierge system 140, in accordance with one or more embodiments. The user interface 500 may be displayed before the start of an ordering session of the user or during the user's in-store purchase using the smart shopping cart 150. Based on outputs of the resource availability computer model and the user targeting computer model, the content presentation module 210 may cause the user client device 100 to display the user interface 500 with a notification message 505 informing the user for availability of the "self-pick scheduled delivery service" (e.g., "Self-pick/scheduled delivery service is available for you!").

Based on an output of the user targeting computer model, the content presentation module 210 may further cause the user client device 100 to display the user interface 500 with a list of service options 510 (e.g., as finalized by the delivery schedule module 280). For example, as shown in FIG. 5, the list of service options 510 may include, e.g., "Delivery in 1 hour—$5" service option and "Delivery in 2-3 hours—$3" service option. Although FIG. 5 includes two possible service options with two different fulfillment costs, it should be understood that the user interface 500 may display only one service option or more than two service options with more than two different fulfillment costs. The user may utilize corresponding selection buttons 515, 520 to select a desired service option. Alternatively, the user may not accept the offer for the "self-pick scheduled delivery service" and may instead choose to proceed with online shopping (e.g., by utilizing a selection button 525). The user's response to the offer for the "self-pick scheduled delivery service" displayed at the user interface 500 may be used (e.g., by the machine-learning training module 230) for re-training of the user targeting computer model and/or the resource availability computer model.

FIG. 6 is a flowchart for a method of using a trained computer model of an online concierge system to predict a scheduled delivery for a self-picked order, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., the online concierge system 140). Additionally, each of these steps may be performed automatically by the online concierge system without human intervention.

The online concierge system 140 receives 605 (e.g., at the user location module 260) a signal from a device associated with a user of the online concierge system 140 (e.g., the user client device 100 or the dashboard 315 of the smart shopping cart 150), wherein the signal indicates that the device associated with the user is either within a defined vicinity from a location of a retailer associated with the online system or physically present at the location of the retailer. Responsive to receiving the signal, the online concierge system 140 accesses 610 a user targeting computer model of the online concierge system 140 (e.g., via the user targeting module 250), wherein the user targeting computer model is trained to predict a likelihood of the user accepting an offer for a scheduled delivery of an order associated with the user, and wherein content of the order is to be self-picked by the user at the location of the retailer. The online concierge system 140 applies 615 the user targeting computer model (e.g., via the user targeting module 250) to generate, based at least in part on user data and ordering data, a score for the user indicative of the likelihood of the user accepting the offer for the scheduled delivery of the order.

Responsive to the score for the user being greater than a threshold score, the online concierge system 140 generates 620 (e.g., via the delivery schedule module 280) a list of service options for the scheduled delivery of the order, e.g., by retrieving a predefined list of service options from a database of the online concierge system 140. The online concierge system 140 causes 625 (e.g., via the content presentation module 210) a user interface of the device associated with the user (e.g., the user client device 100 or the dashboard 315 of the smart shopping cart 150) to display the list of service options for the scheduled delivery of the order prompting the user to select a service option for the scheduled delivery of the order from the list of service options. In one or more embodiments, the device associated with the user is a physical receptacle (e.g., the smart shopping cart 150). In such cases, the online concierge system 140 may causes (e.g., via the content presentation module 210) the user interface of the physical receptacle (e.g., the dashboard 315) to display the list of service options for the scheduled delivery of the order prompting the user to use the user interface of the physical receptacle for selection of the service option for the scheduled delivery of the order from the list of service options.

Responsive to receiving the signal, the online concierge system 140 may access a resource availability computer model of the online concierge system 140 (e.g., via the resource availability module 270), wherein the resource availability computer model is trained to predict a likelihood for availability of resources for the scheduled delivery of the order. The online concierge system 140 may apply the resource availability computer model to generate, based at least in part on one or more attributes of the location of the retailer and one or more attributes of a delivery network associated with the online system, a resource availability score indicative of the likelihood for availability of resources for the scheduled delivery of the order. Responsive to the resource availability score being greater than a threshold availability score, the online concierge system 140 may apply the user targeting computer model to generate the score for the user indicative of the likelihood of the user accepting the offer for the scheduled delivery of the order.

The online concierge system 140 may receive, from a computing system associated with the retailer (e.g., the retailer computing system 120) and via a network (e.g., the network 130), the one or more attributes of the location of the retailer. In receiving the one or more attributes of the location of the retailer, the online concierge system 140 may receive at least one of: information about a current capacity of a packing storage space at the location of the retailer, or information about a current capacity of a refrigerator-based storage space at the location of the retailer. The online concierge system 140 may further receive, from the computing system associated with the retailer via the network, the one or more attributes of the delivery network. In receiving the one or more attributes of the delivery network, the online concierge system 140 may receive at least one of: information about availability of a driver to fulfill the scheduled delivery of the order, or information about a cost to fulfill the scheduled delivery of the order.

The online concierge system 140 may match (e.g., via the resource availability module 270) the user with a picker associated with the online concierge system 140 who is scheduled to visit the location of the retailer for fulfillment of one or more other orders. The online concierge system 140 may apply the resource availability computer model (e.g., via the resource availability module 270) to generate, based on an indication of matching the user with the picker, the resource availability score.

The online concierge system 140 may receive (e.g., at the user targeting module 250 and/or the user location module 260), from the device associated with the user (e.g., the user client device 100) and via the network, the user data. In receiving the user data, the online concierge system 140 may receive at least one of: a delivery address of the user, a geographical location of the user relative to the location of the retailer, a geographical location of the user where there is a prediction for an inclement weather, a list of items for purchase made by the user at the device that includes a set of frozen food items, information that the user is viewing at the user interface of the device one or more promotion coupons associated with purchasing at the location of the retailer, or an indication that the user arrived at the location of the retailer without using a motor vehicle.

The online concierge system 140 may retrieve (e.g., via the user targeting module 250), from a database of the online concierge system 140 (e.g., at the data store 240), the user data. In retrieving the user data, the online concierge system 140 may retrieve at least one of: information about a user purchasing pattern of the user over a defined time period, information about a collection of items previously purchased by the user, information that the user purchased items at the location of the retailer at least a threshold number of times, or information that the user previously used one or more scheduled delivery services for one or more orders self-picked by the user at one or more locations of one or more retailers.

The online concierge system 140 may gather the ordering data using one or more sensors (e.g., weight sensors 305 and/or cameras 310) mounted to a physical receptacle (e.g., the smart shopping cart 150) when the user is adding a set of items from the location of the retailer to the physical receptacle, wherein the physical receptacle is in communication with the online concierge system 140. For example, the gathered ordering data may be communicated from the smart shopping cart 150, via the network, to the user targeting module 250. The online concierge system 140 may gather the ordering data including at least one of: a weight of the set of items in the physical receptacle, a quantity of the set of items in the physical receptacle, a set of features associated with the set of items, a timestamp when the user started purchasing at the location of the retailer using the physical receptacle, information about detection of a physical limitation associated with the user, or information about a behavior of the user during purchasing at the location of the retailer using the physical receptacle.

The online concierge system 140 may gather, via a computer system attached to or otherwise in communication with the physical receptacle (e.g., the smart shopping cart 150), the ordering data including information about the user being physically present at the location of the retailer and adding one or more items from the location of the retailer to a physical receptacle. For example, the gathered ordering data may be communicated from the smart shopping cart 150, via the network, to the user targeting module 250. The online concierge system 140 may apply the user targeting computer model (e.g., via the user targeting module 250) to generate, based on the information about the user adding the one or more items from the location of the retailer to the physical receptacle, the score for the user. Responsive to the score for the user being greater than the threshold score, the online concierge system 140 may cause a user interface of the computer system (e.g., the dashboard 315) to display the list of service options for the scheduled delivery of the order prompting the user to leave the physical receptacle at the location of the retailer and select the service option for the scheduled delivery of the order from the list of service options.

Upon the user's selection of service option for the scheduled delivery, a notification message may be sent from the device associated with the user, via the network 130, to the online concierge system 140 (e.g., the order management order 220). Based on the received notification message, the online concierge system 140 (e.g., the order management order 220) may send a request for fulfillment of the scheduled order delivery to a group of pickers (e.g., picker client devices 110 via the network 130). After a first picker in the group accepts the request, that picker is assigned to fulfill the scheduled delivery of the order.

The online concierge system 140 may collect (e.g., via the machine-learning training module 230) feedback data with information about a response by the user in relation to the list of service options for the scheduled delivery of the order that is displayed at the user interface of the device associated with the user. The online concierge system 140 may re-train (e.g., via the machine-learning training module 230) the user targeting computer model by updating, using the collected feedback data, a set of parameters of the user targeting computer model. Additionally, the online concierge system 140 may update (e.g., via the delivery schedule module 280) the threshold score using the collected feedback data.

Embodiments of the present disclosure are directed to the online concierge system 140 that uses trained computer models to generate a recommendation for a user of the online concierge system 140 to select a scheduled delivery for an order which is or will be self-picked by the user at a location of a retailer that is associated with the online concierge system 140. Input signals provided to the trained computer models are related to various reasons why the user may want to utilize the scheduled delivery of the self-picked order. The online concierge system 140 may be integrated with the smart shopping cart 150 to offer a scheduled delivery for an order that is or will be self-picked by the user via the smart shopping cart 150. Hence, the online concierge system 140 presented herein offers to users to self-pick their orders, optionally checkout with the smart shopping cart 150, and leave the smart shopping cart 150 at the location of the retailer where pickers associated with the online concierge system 140 would pick the self-picked orders up later for scheduled deliveries.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network and from a smart shopping cart at a location of a retailer, a signal indicating that a user of an online system is physically present at the location of the retailer;

gathering, via sensors mounted to the smart shopping cart, ordering data including information about a set of items added by the user from the location of the retailer to the smart shopping cart;

responsive to receiving the signal, accessing a user targeting model, wherein the user targeting model is a machine-learning model trained to predict a likelihood of the user accepting an offer for a scheduled delivery of an order including the set of items, and wherein content of the order is to be self-picked by the user at the location of the retailer;

applying the user targeting model to user data including information about the user and the ordering data to generate a score for the user indicative of the likelihood of the user accepting the offer for the scheduled delivery of the order;

responsive to the score for the user being greater than a threshold score, generating a list of service options for the scheduled delivery of the order; and causing a user interface of the smart shopping cart to display the list of service options for the scheduled delivery of the order prompting the user to select, via the user interface of the smart shopping cart, a service option for the scheduled delivery of the order from the list of service options.

2. The method of claim 1, further comprising:

responsive to receiving the signal, accessing a resource availability model, wherein the resource availability model is a machine-learning model trained to predict a likelihood for availability of resources for the scheduled delivery of the order;

applying the resource availability model to one or more attributes of the location of the retailer and one or more attributes of a delivery network associated with the online system to generate a resource availability score indicative of the likelihood for availability of resources for the scheduled delivery of the order; and responsive to the resource availability score being greater than a threshold availability score, applying the user targeting model to generate the score for the user indicative of the likelihood of the user accepting the offer for the scheduled delivery of the order.

3. The method of claim 2, further comprising:

receiving, via the network and from a computing system associated with the retailer, the one or more attributes of the location of the retailer, wherein the one or more attributes of the location of the retailer include at least one of information about a current capacity of a packing storage space at the location of the retailer or information about a current capacity of a refrigerator-based storage space at the location of the retailer.

4. The method of claim 2, further comprising:

receiving, via the network and from a computing system associated with the retailer, the one or more attributes of the delivery network, wherein the one or more attributes of the delivery network include at least one of information about availability of a driver to fulfill the scheduled delivery of the order or information about a cost to fulfill the scheduled delivery of the order.

5. The method of claim 2, wherein applying the resource availability model comprises:

matching the user with a picker associated with the online system who is scheduled to visit the location of the retailer for fulfillment of one or more other orders; and applying the resource availability model to an indication of matching the user with the picker to generate the resource availability score.

6. The method of claim 1, further comprising:

receiving, via the network and from a device associated with the user, the user data including at least one of a delivery address of the user, a geographical location of the user relative to the location of the retailer, a geographical location of the user where there is a prediction for an inclement weather, a list of items for purchase made by the user at the device that includes a set of frozen food items, information that the user is viewing at the user interface of the device one or more promotion coupons associated with purchasing at the location of the retailer, or an indication that the user arrived at the location of the retailer without using a motor vehicle.

7. The method of claim 1, further comprising:

retrieving, from a database of the online system, the user data including at least one of information about a purchasing pattern of the user over a defined time period, information about a collection of items previously purchased by the user, information that the user purchased items at the location of the retailer at least a threshold number of times, or information that the user previously used one or more scheduled delivery services for one or more orders self-picked by the user at one or more locations of one or more retailers.

8. The method of claim 1, wherein gathering the ordering data comprises:

gathering at least one of a weight of the set of items in the smart shopping cart, a quantity of the set of items in the smart shopping cart, a set of features associated with the set of items, a timestamp when the user started purchasing at the location of the retailer using the smart shopping cart, information about detection of a physical limitation associated with the user, or information about a behavior of the user during purchasing at the location of the retailer using the smart shopping cart.

9. The method of claim 1, further comprising:

gathering, via a computer system, the ordering data including information about the user being physically present at the location of the retailer and adding one or more items from the location of the retailer to the smart shopping cart, the computer system attached to or otherwise in communication with the smart shopping cart; and applying the user targeting model further to the information about the user adding the one or more items from the location of the retailer to the smart shopping cart to generate the score for the user, wherein displaying the list of service options for the scheduled delivery of the order at the user interface of the smart shopping cart prompts the user to leave the smart shopping cart at the location of the retailer after selecting the service option for the scheduled delivery of the order from the list of service options.

10. The method of claim 1, further comprising:

collecting feedback data with information about a response by the user in relation to the list of service options for the scheduled delivery of the order that is displayed at the user interface of the smart shopping cart; and re-training the user targeting model by updating, using the collected feedback data, a set of parameters of the user targeting model.

11. A computer program product comprising a non-transitory computer readable storage medium having instructions encoded thereon that, when executed by a processor, cause the processor to perform steps comprising:

receiving, via a network and from a smart shopping cart at a location of a retailer, a signal indicating that a user of an online system is physically present at the location of the retailer;

gathering, via sensors mounted to the smart shopping cart, ordering data including information about a set of items added by the user from the location of the retailer to the smart shopping cart;

responsive to receiving the signal, accessing a user targeting model, wherein the user targeting model is a machine-learning model trained to predict a likelihood of the user accepting an offer for a scheduled delivery of an order including the set of items, and wherein content of the order is to be self-picked by the user at the location of the retailer;

applying the user targeting model to user data including information about the user and the ordering data to generate a score for the user indicative of the likelihood of the user accepting the offer for the scheduled delivery of the order;

responsive to the score for the user being greater than a threshold score, generating a list of service options for the scheduled delivery of the order; and causing a user interface of the smart shopping cart to display the list of service options for the scheduled delivery of the order prompting the user to select, via the user interface of the smart shopping cart, a service option for the scheduled delivery of the order from the list of service options.

12. The computer program product of claim 11, wherein the instructions further cause the processor to perform steps comprising:

responsive to receiving the signal, accessing a resource availability model, wherein the resource availability model is a machine-learning model trained to predict a likelihood for availability of resources for the scheduled delivery of the order;

applying the resource availability model to one or more attributes of the location of the retailer and one or more attributes of a delivery network associated with the online system to generate a resource availability score indicative of the likelihood for availability of resources for the scheduled delivery of the order; and responsive to the resource availability score being greater than a threshold availability score, applying the user targeting model to generate the score for the user indicative of the likelihood of the user accepting the offer for the scheduled delivery of the order.

13. The computer program product of claim 12, wherein the instructions further cause the processor to perform steps comprising:

receiving, via the network and from a computing system associated with the retailer, the one or more attributes of the location of the retailer, wherein the one or more attributes of the location of the retailer include at least one of information about a current capacity of a packing storage space at the location of the retailer or information about a current capacity of a refrigerator-based storage space at the location of the retailer; and receiving, via the network and from a computing system associated with the retailer, the one or more attributes of the delivery network, wherein the one or more attributes of the delivery network include at least one of information about availability of a driver to fulfill the scheduled delivery of the order or information about a cost to fulfill the scheduled delivery of the order.

14. The computer program product of claim 12, wherein the instructions further cause the processor to perform steps comprising:

matching the user with a picker associated with the online system who is scheduled to visit the location of the retailer for fulfillment of one or more other orders; and applying the resource availability model to an indication of matching the user with the picker to generate the resource availability score.

15. The computer program product of claim 11, wherein the instructions further cause the processor to perform steps comprising:

receiving, via the network and from a device associated with the user, the user data including at least one of a delivery address of the user, a geographical location of the user relative to the location of the retailer, a geographical location of the user where there is a prediction for an inclement weather, a list of items for purchase made by the user at the device that includes a set of frozen food items, information that the user is viewing at the user interface of the device one or more promotion coupons associated with purchasing at the location of the retailer, or an indication that the user arrived at the location of the retailer without using a motor vehicle.

16. The computer program product of claim 11, wherein the instructions further cause the processor to perform steps comprising:

gathering the ordering data including at least one of: a weight of the set of items in the smart shopping cart, a quantity of the set of items in the smart shopping cart, a set of features associated with the set of items, a timestamp when the user started purchasing at the location of the retailer using the smart shopping cart, information about detection of a physical limitation associated with the user, or information about a behavior of the user during purchasing at the location of the retailer using the smart shopping cart.

17. The computer program product of claim 11, wherein the instructions further cause the processor to perform steps comprising:

gathering, via a computer system, the ordering data including information about the user being physically present at the location of the retailer and adding one or more items from the location of the retailer to the smart shopping cart, the computer system attached to or otherwise in communication with the smart shopping cart; and applying the user targeting model further to the information about the user adding the one or more items from the location of the retailer to the smart shopping cart to generate the score for the user, wherein displaying the list of service options for the scheduled delivery of the order at the user interface of the smart shopping cart prompts the user to leave the smart shopping cart at the location of the retailer after selecting the service option for the scheduled delivery of the order from the list of service options.

18. A computer system comprising:

a processor; and a non-transitory computer-readable storage medium having instructions that, when executed by the processor, cause the computer system to perform steps comprising:

receiving, via a network and from a smart shopping cart at a location of a retailer, a signal indicating that a user of an online system is physically present at the location of the retailer;

gathering, via sensors mounted to the smart shopping cart, ordering data including information about a set of items added by the user from the location of the retailer to the smart shopping cart;

responsive to receiving the signal, accessing a user targeting model, wherein the user targeting model is a machine-learning model trained to predict a likelihood of the user accepting an offer for a scheduled delivery of an order including the set of items, and wherein content of the order is to be self-picked by the user at the location of the retailer;

applying the user targeting model to user data including information about the user and the ordering data to generate a score for the user indicative of the likelihood of the user accepting the offer for the scheduled delivery of the order;

responsive to the score for the user being greater than a threshold score, generating a list of service options for the scheduled delivery of the order; and causing a user interface of the smart shopping cart to display the list of service options for the scheduled delivery of the order prompting the user to select, via the user interface of the smart shopping cart, a service option for the scheduled delivery of the order from the list of service options.

\* \* \* \* \*